United States Patent Office 3,290,138
Patented Dec. 6, 1966

3,290,138
PROCESS FOR SLOW RELEASE FERTILIZERS COMPRISING UREA, PARAFFIN WAX, AND ADDUCT-INHIBITING CHLORINATED WAX
John J. Melchiore, Wallingford, and Wilmer E. McCorquodale, Jr., Havertown, Pa., assignors to Sun Oil Company, Philadelphia, Pa., a corporation of New Jersey
No Drawing. Filed Oct. 10, 1963, Ser. No. 315,354
7 Claims. (Cl. 71—28)

This invention relates in one aspect to a method of forming a stable dispersion of urea in molten paraffin wax. The dispersion is stable in that the urea does not react with the molten paraffin wax to form an adduct. This reaction is prevented, and stability thus imparted to the dispersion, by incorporating into the paraffin wax a small amount of chlorinated wax. The stable dispersion is useful in that a slow release urea fertilizer can be made therefrom and the invention also relates to such slow release fertilizer compositions.

Nitrogen, potassium, and phosphorus are essential elements for plant growth and commercially available fertilizers invariably contain one or more of these elements. Examples of those infrequent use at the present time include urea, ammonium nitrate, potassium chloride, sodium nitrate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20-10-5 fertilizer contains 20% nitrogen, 10% phosphorus, and 5% potassium by weight. Fertilizers lacking an essential element are also described by this system but by conventional terminology they are not complete fertilizers. Thus a 10-0-10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen to the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of the wax. The resulting particles are a dispersion of solid fertilizer particles in solid wax. Substantially all the fertilizer particles are surrounded by and encased in wax. They can also be described as a slow release fertilizer. The water resistance of the fertilizer can be varied, by varying the amount of wax in the dispersion, so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50%, and a minor amount, i.e., less than 50%, of wax. Usually the amount of urea will be 50-80%, more frequently 50-70%, and the amount of wax will be 15-49%, more frequently 25-49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50-80% and 15-49% respectively, more frequently 50-70% and 25-49% respectively, but the actual amount of urea may in some cases be relatively small. For example, a 10-10-10 complete slow release fertilizer might contain the following:

| | Percent |
|---|---|
| Urea | 21.4 |
| Triple superphosphate | 21.8 |
| Potassium chloride | 16.7 |
| Wax | 40.1 |
| | 100.0 |

A 5-15-10 complete slow release fertilizer might contain

| | Percent |
|---|---|
| Urea | 10.7 |
| Triple superphosphate | 32.6 |
| Potassium sulfate | 18.5 |
| Wax | 38.2 |
| | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5–80% urea, more frequently 20–70%, and the amount of wax will usually be 15–49%, more frequently 25–49%.

Although several different kinds of waxes can be used to prepare a slow release fertilizer paraffin wax is often preferred because of its generally lower cost. However when urea is mixed, i.e., dispersed in, molten paraffin wax a difficulty is encountered. When the urea and molten paraffin wax are initially mixed, nothing unusual occurs. Shortly after mixing, however, a white precipitate forms. If the ratio of urea to molten paraffin wax is higher than 1:1, the entire mass becomes a solid having about the texture of wet sand. In this case it is extremely difficult to even remove the solid mass from the mixing vessel. The solid precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea–25% paraffin wax. The time required for adduction, i.e., for the formation of the precipitate, varies somewhat but appears to depend mainly upon urea particle size. When commercial crystal urea, which has a particle size of mainly larger than 100 mesh (all mesh sizes are by U.S. Standard Sieves) is used, adduction generally occurs in less than 15 minutes. When urea having a particle size of 100% through 200 mesh is used, adduction generally occurs in less than 5 minutes. In any event the adduction reaction often occurs before the dispersion of urea in wax, containing other fertilizer ingredients as the case may be, can be shaped into small particles.

The solid adduct inself has some slow release properties and has been disclosed and claimed in a copending application Serial No. 308,087, filed September 11, 1963. In fact the water resistance of a urea-paraffin wax adduct is higher than the water resistance of a dispersion of urea in paraffin wax containing the same total amounts of urea and wax but in which the urea is in the unadducted form. Unfortunately, the water resistance of the adduct has sometimes been found to decrease very rapidly after prolonged contact with water. This decrease is an unpredictable phenomenon in that some batches of adduct exhibit it while other, apparently identical, batches do not. Because of this erratic behavior it is frequently preferable that the slow release fertilizer be a dispersion of solid urea in solid paraffin wax rather than a urea-paraffin wax adduct. Where such is the case a method of preventing or at least postponing the adduction reaction is necessary in order that such reaction does not occur during the time the dispersion is being processed into small particles. We have now found such a method.

According to the invention, reaction between urea and molten paraffin wax to form an adduct is prevented by incorporating, i.e., dissolving, a small amount of chlorinated wax in the molten paraffin wax. The term chlorinated wax is a conventional term and refers to materials which have long been articles of commerce. Chlorinated wax is, as the name implies, wax which has been chlorinated. It has been used extensively heretofore, in textile flameproofing compositions for example; consequently its characteristics and method of preparation are well known. The usual method of preparation involves bubbling chlorine into molten wax at a temperature of about 60°–120° C. Addition of chlorine is stopped when the chlorine content of the wax has reached the desired level. Chlorinated wax normally contains 10–80% chlorine (as Cl) and this is satisfactory for the present purpose although preferably for the present purpose the chlorine content is 20–60%, more preferably 30–50%. The product is liquid, semifluid, or solid depending upon the type of wax used as starting material and upon the degree of chlorination. The wax used as starting material can be any animal, vegetable, or mineral wax such as paraffin wax, beeswax, montan wax, ozocerite wax, carnauba wax, sugarcane wax, japanwax, microcrystlline wax, etc. Paraffin wax is the preferred wax starting material because it is usually less expensive than other types of waxes. This type of wax is described in more detail hereinafter.

Another method of preparing chlorinated wax involves conducting chlorine into a solution or suspension of the wax in an inert diluent such as carbon tetrachloride and using ultraviolet light as a catalyst for the chlorination reaction. By using this procedure products containing less color can be obtained and the chlorination reaction can be carried out at a lower temperature than in the procedure first described.

As described previously, adduction of a mixture of urea and molten paraffin wax can be prevented by dissolving in the molten paraffin wax a small amount of chlorinated wax. It is recognized that in a substantially homogeneous mixture of molten paraffin wax and chlorinated wax, the latter may not be "dissolved" in the wax in the technical sense of the word. However, such a mixture has the appearance of a true solution and therefore is so referred to for the present purpose, i.e., in a homogeneous mixture of paraffin wax and chlorinated wax the latter is dissolved in the former.

The amount of chlorinated wax used should of course be a stabilizing amount, i.e., the amount should be sufficient to prevent or at least substantially delay the adduction reaction. Since a dispersion of urea in molten paraffin wax will normally be processed into fertilizer particles the amount of chlorinated wax employed should normally be sufficient to prevent adduction until such processing is effected. Whether the amount is sufficient is readily determined by observing whether a white precipitate forms when the solid urea and molten paraffin wax are mixed. More specifically, the amount of chlorinated wax should normally be at least 0.5% based on the weight of molten paraffin wax, preferably at least 1%, more preferably at least 3%. Preferably not more than 15% chlorinated wax is used, more preferably not more than 10%, since it is usually desirable to minimize the amount of nonfertilizer ingredients in the slow release fertilizer, although amounts of chlorinated wax as high as 25% can be used if desired. As previously stated the amount of paraffin wax and urea will usually be 15–49 parts and 5–80 parts respectively, more frequently 25–49 parts and 20–70 parts respectively.

The dissolution of the chlorinated wax in the molten paraffin wax and the subsequent addition of urea (and any other fertilizer ingredients as the case may be), can be effected in any convenient manner. Preferably, the paraffin wax is heated to about 200°–250° F. and the chlorinated wax is then added and the mixture stirred until the chlorinated wax dissolves in the paraffin wax. After the chlorinated wax has dissolved the temperature of the chlorinated wax-paraffin wax solution is preferably lowered to slightly (e.g., 10°–20° F.) above the melting point of the paraffin wax. This is to eliminate any possibility of adduction. The adduction reaction occurs more readily at higher temperatures, hence reducing the temperature should aid in preventing it. Next the urea is charged to the paraffin wax-chlorinated wax mixture. If other fertilizer ingredients are to be included they are also added to the molten wax at this time. After dispersing the fertilizer ingredients in the mixture the dispersion can be formed into discrete particles in any convenient manner such as in a pellet mill, etc., after which the particles are cooled to obtain solid slow release fertilizer particles. As previously described the invention also embraces such slow release fertilizers, i.e., slow release fertilizers containing solid urea dispersed in solid paraffin wax, the paraffin wax having chlorinated wax dissolved therein.

An alternative but less preferable methods of forming the dispersion is to charge the urea to the molten paraffin wax after which the chlorinated wax is then dissolved in the paraffin wax. This method is considerably less desirable since the urea may and frequently does react with the paraffin wax to form the adduct before the chlorinated wax can be dissolved in the paraffin wax. This problem is obviated by dissolving the chlorinated wax in the paraffin wax prior to the addition of urea.

The term paraffin wax is used throughout this specification in accordance with its conventional meaning. It is one of only two waxes obtainable from petroleum, the other being microcrystalline wax. The differences and similarities between these two kinds of wax are well known to those skilled in the art and are summarized in Bennett, Commercial Waxes, Chemical Publishing Co., (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
|---|---|---|
| Molecular Weight | 250–500 | 500–800 |
| Melting Point, °F. (ASTM D-127) | 110–165 | 140–210 |
| Viscosity at 210° F. (ASTM D-446), S.U.S. | 30–50 | 60–100 |
| Penetration at 77° F. (ASTM D-1321, 100 g., 5 sec.) dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. The invention is preferably applicable to the dispersion of urea in a paraffin wax having melting point, viscosity, and penetration within the ranges stated in Table I above. All wax properties specified herein are by the appropriate tests indicated in the above Table.

The following example illustrate the benefits which can be obtained by the methods of the invention.

*Example I.*—40 parts of a paraffin wax having a melting point of 129° F., a penetration at 77° F. of 18 dmm., and a viscosity at 210° F. of 38 S.U.S. are charged to a mixing tank equipped with heating means. The wax is heated to 220° F. To the resulting molten wax 60 parts of commercial crystal urea are added with stirring. After all the urea is added stirring is continued. In five minutes the entire contents of the mixing tank have become a solid having about the texture of wet sand. The solid is analyzed by X-ray diffraction and differential thermal analysis and is found to contain a substantial amount of a urea-paraffin wax adduct, a small amount of paraffin wax, and essentially no free urea.

*Example II.*—The procedure is the same as in Example I except that 38 parts of paraffin wax are used and prior to adding the urea 2 parts of chlorinated wax are added to the molten paraffin wax and stirred until they dissolve therein. The chlorinated wax is a chlorinated paraffin wax obtained by bubbling chlorine into a molten paraffin wax which has a melting point of 142° F., a penetration at 77° F. of 9 dmm., and a viscosity at 210° F. of 40.0 S.U.S. The chlorination reaction is carried out at 175° F. and is stopped when the paraffin wax contains 40% combined chlorine. The temperature of the chlorinated wax-molten paraffin wax solution at the time the urea is added thereto is 220° F. After adding the urea stirring is continued as in Example I. After 1 hour stirring adduction has not occurred. The dispersion of urea in molten paraffin wax, the latter containing 5.3% chlorinated wax based on the weight of molten paraffin wax, remains fluid and can be shaped into fertilizer particles in any convenient manner such as by means of a mold, etc.

Similar results are obtained when other chlorinated waxes of the types described herein are employed. The results are similar in that the adduction reaction is prevented or at least delayed for a substantial period of time.

The invention claimed is:

1. Method of forming a slow release fertilizer comprising a dispersion of solid urea in a solid paraffin wax which when in molten state normally reacts with solid urea to form an adduct which comprises (1) heating said paraffin wax to above its melting point whereby molten paraffin wax normally susceptible to adduction is obtained, (2) dissolving a chlorinated wax containing 10–80% chlorine in the resulting molten paraffin wax as an adduct inhibitor, the amount of said chlorinated wax being at least 0.5% by weight of said molten paraffin wax and being sufficient to inhibit adduction of said molten paraffin wax, (3) dispersing solid urea in the molten paraffin wax containing said adduct inhibitor, and (4) cooling the resulting dispersion to below the melting point of the wax whereby a slow release fertilizer comprising a dispersion of solid urea in solid paraffin wax is obtained.

2. Method according to claim 1 wherein said chlorinated wax is a chlorinated paraffin wax.

3. Method according to claim 2 wherein said chlorinated paraffin wax contains 20–60% chlorine.

4. Method according to claim 1 wherein the amount of said chlorinated wax is 1–25%.

5. Method according to claim 1 wherein the amount of urea is 50–80 parts and the amount of molten paraffin wax is 15–49 parts.

6. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving a chlorinated wax containing 10–80% chlorine in said molten paraffin wax, the amount of said chlorinated wax being at least 0.5% by weight of said molten paraffin wax.

7. A process according to claim 6 wherein the amount of said chlorinated wax is at least 3%.

References Cited by the Examiner

UNITED STATES PATENTS

| | | | |
|---|---|---|---|
| 2,936,226 | 5/1960 | Kaufman et al. | 71—64 |
| 2,944,918 | 7/1960 | Nagel et al. | 117—168 |
| 3,014,783 | 12/1961 | Young | 71—64 |

OTHER REFERENCES

Hagan, Sister M.; Clathrate Inclusion Compounds, Reinhold Publishing Corp., New York, (1962), pp. 10–15.

DONALL H. SYLVESTER, *Primary Examiner.*

ANTHONY SCIAMANNA, T. D. KILEY,
*Assistant Examiners.*